UNITED STATES PATENT OFFICE.

WILLIAM I. ADAMS, OF BALTIMORE, MARYLAND.

PROCESS OF SLAKING LIME.

SPECIFICATION forming part of Letters Patent No. 309,328, dated December 16, 1884.

Application filed April 9, 1884. (No specimens.)

*To all whom it may concern:*

Be it known that I, WILLIAM I. ADAMS, a citizen of the United States, residing at Baltimore, in the county of Baltimore and State of Maryland, have invented certain new and useful Improvements in a Process of Slaking Lime, of which the following is a specification.

Heretofore lime has been slaked by taking the lime as it comes from the kiln and applying water to it in the open air, which has several serious objections—namely, those portions which are hardest require a longer period to become thoroughly slaked, while the smaller particles, which are more readily slaked, become overheated, which results in their losing certain properties, such as adhesiveness, &c., and those portions that are not thoroughly slaked will blister plastering by slaking when on the wall, causing great annoyance and extra expense. There is also more or less waste in the present mode, as it is seldom that all portions of the lime can be put in a homogeneous condition. This causes those portions which are not slaked to be discarded, which results in constant waste of what might be utilized if properly treated. Again, in slaking in the open air the lime loses a portion of its strength, which decreases its value, especially for whitewashing, coloring, &c., as it is the minute particles that pass off which are the most desirable for the latter applications, and at the same time causing a great annoyance to the workmen and others in the vicinity.

The object of my invention is to provide means by which the lime may be thoroughly slaked without losing any of its strength or substance, and reducing it to a perfect homogeneous condition, thereby overcoming the objections heretofore mentioned. I attain these results by the following process: By first taking the lime as it comes from the kiln (which is generally in a lumpy condition of greater or less density) and passing it through a crusher or pulverizer, which reduces it to a comparative size or condition; and to insure such a result I afterward pass it through a bolter or sieve, which prevents any possibility of larger particles than a given size getting through, said larger particles being returned to the pulverizer to be reground. Having now reduced the lime to a uniform condition, it is passed into a slaking-chamber, which is provided with mixing-paddles, which are driven by any suitable power and which continually disturb the lime as the water is applied, thereby subjecting all portions of the lime to the water as it slakes. The chamber being air-tight (comparatively speaking) prevents any particles or substance from escaping as the slaking is taking place, the water being supplied through pipes of suitable construction. After it is thoroughly mixed or slaked, it is drawn off into vats and left standing therein a sufficient time under water to allow any particles which may not be thoroughly slaked in the mixing-chamber to become so, from which it is removed, and is then ready for use. The advantage of this method is that all particles of the lime are thoroughly slaked, which produce a superior result, utilizing all portions of the lime, thereby having no waste, and preventing any particle from escaping, at the same time avoiding the nuisance and loss of the finely-pulverized lime from flying on the application of the water.

Having fully described my invention, what I claim, and wish to secure by Letters Patent of the United States, is—

1. The method, as herein described, of slaking lime by first reducing the lime to a uniform condition by pulverization and bolting, then placing it in a tight or covered slaking-chamber, and while inclosed applying the water and stirring, for the purpose and as herein specified.

2. The process of slaking lime by first reducing it to a uniform condition by pulverization, and then subjecting it to the water while in an inclosed mixing-chamber, for the purpose as herein specified.

In testimony whereof I affix my signature in presence of two witnesses.

WILLIAM I. ADAMS.

Witnesses:
JNO. T. MADDOX,
G. A. BOYDEN.